No. 711,142. Patented Oct. 14, 1902.
C. H. WILLIAMS.
COMBINED STOCK AND HAY RACK FOR WAGONS.
(Application filed Feb. 15, 1902.)
(No Model.) 2 Sheets—Sheet 1.
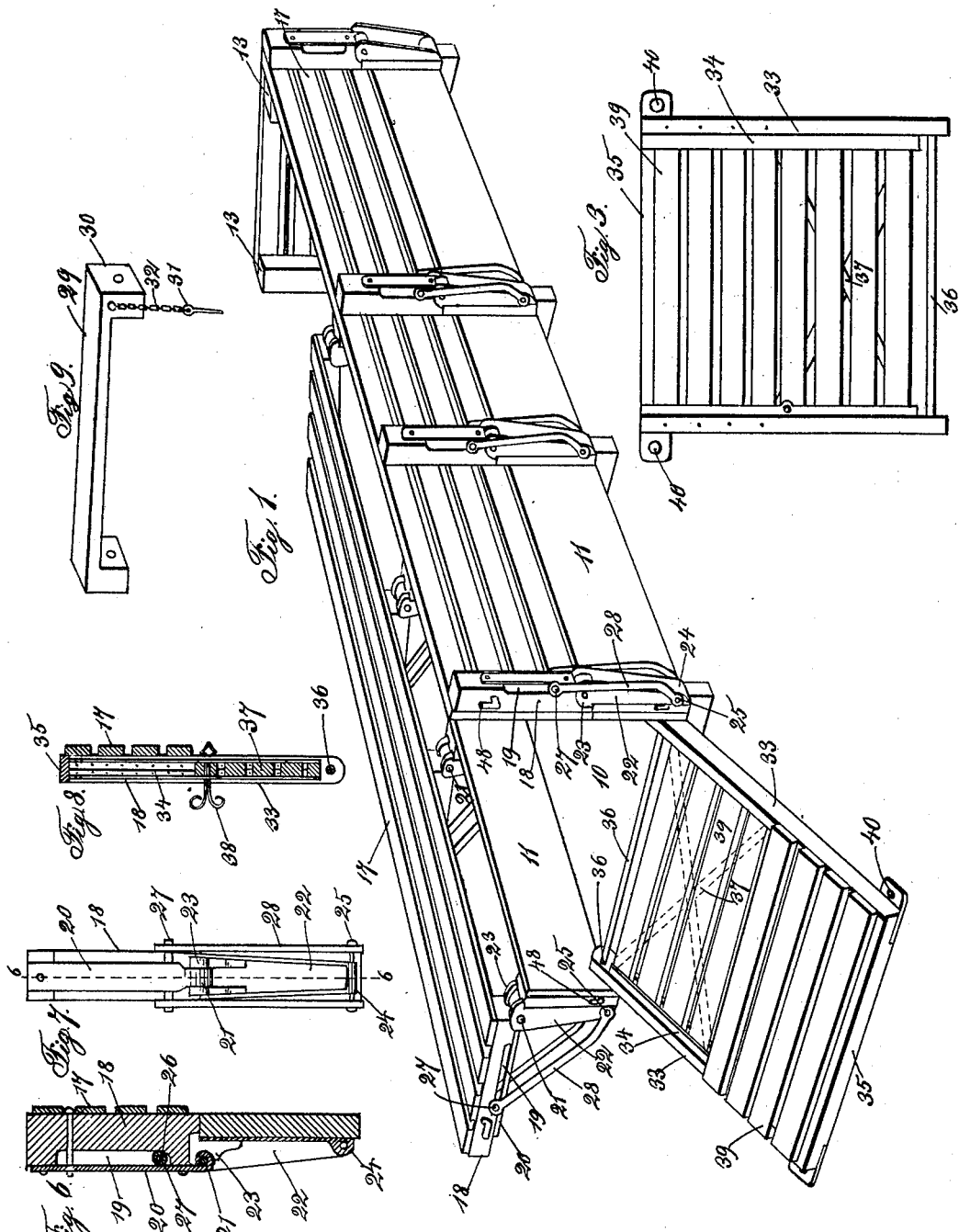
Witnesses:
Henry Manger
J. R. Lowry
Inventor: Clarence H. Williams.
by Orwig & Lane Atty's.

No. 711,142. Patented Oct. 14, 1902.
C. H. WILLIAMS.
COMBINED STOCK AND HAY RACK FOR WAGONS.
(Application filed Feb. 15, 1902.)
(No Model.) 2 Sheets—Sheet 2.
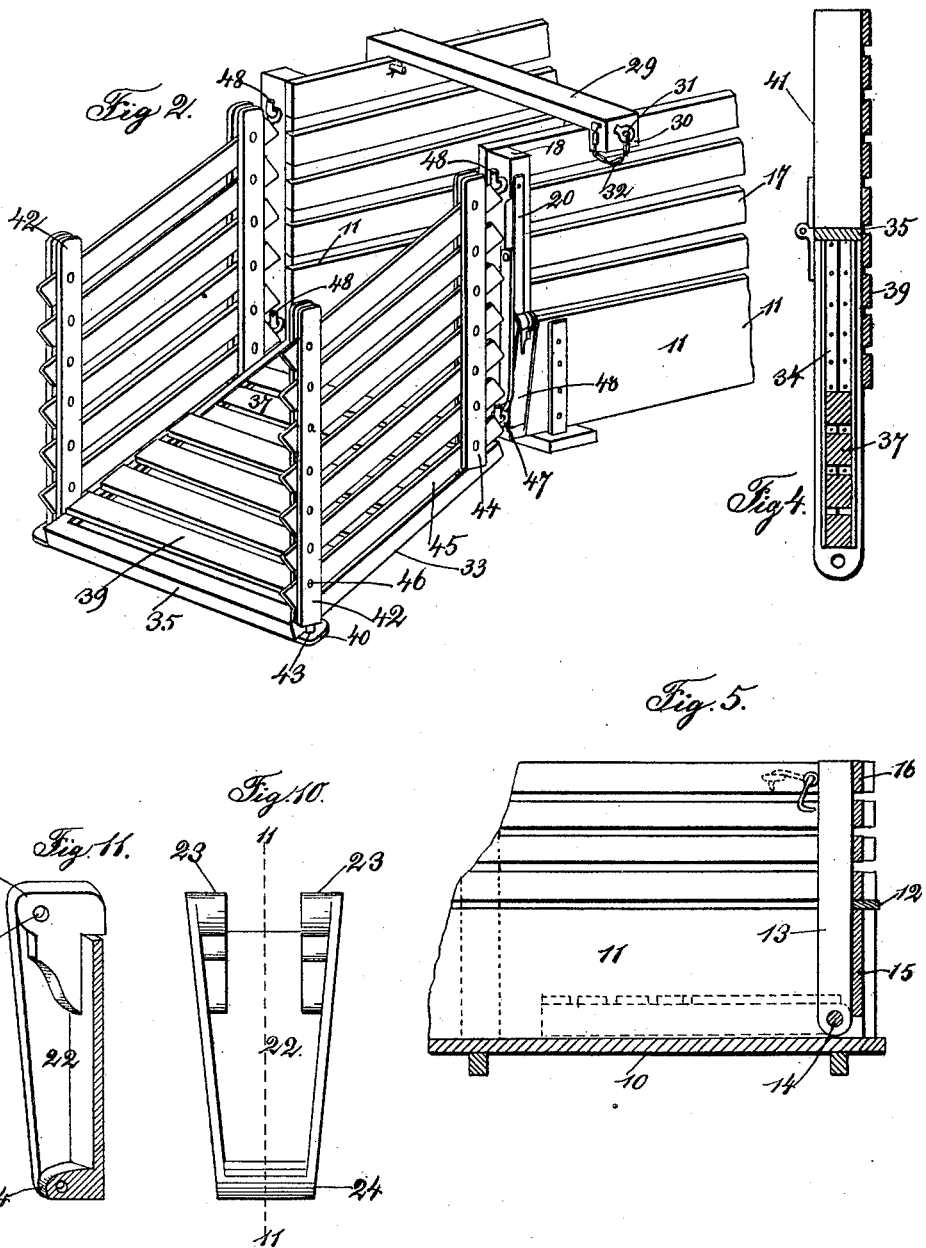
Witnesses:
Henry Manger
J. R. Lowery
Inventor: Clarence H. Williams.
by Irving Lane Atty's

UNITED STATES PATENT OFFICE.

CLARENCE H. WILLIAMS, OF RISINGSUN, IOWA.

COMBINED STOCK AND HAY RACK FOR WAGONS.

SPECIFICATION forming part of Letters Patent No. 711,142, dated October 14, 1902.

Application filed February 15, 1902. Serial No. 94,306. (No model.)

*To all whom it may concern:*

Be it known that I, CLARENCE H. WILLIAMS, a citizen of the United States, residing at Risingsun, in the county of Polk and State of Iowa, have invented certain new and useful Improvements in a Combined Stock and Hay Rack for Wagons, of which the following is a specification.

The objects of my invention are to provide a device of this class that will be of simple, durable, and inexpensive construction, and that may be readily, quickly, and easily transferred to serve either as a stock-rack or as a hay-rack.

A further object is to provide an improved combined end-gate and stock-loading platform designed when in one position to serve as an end-gate and capable of swinging rearwardly and downwardly, so that its rear end may rest upon the ground and the end-gate will serve as a platform upon which stock may be loaded into the wagon; and in this connection it is my further object to provide a combined end-gate and platform of this class that may be of the ordinary length of an end-gate when used as an end-gate, and when designed for use as a platform it may be of double the usual length, so that a gradual approach is provided upon which the stock may enter the wagon.

A further object is to provide improved detachable side pieces, which may be applied to the end-gate when it is used as a loading-platform to prevent animals from stepping off of the platform after they have started on it; and in this connection it is my object to provide side pieces which may adapt themselves in shape to the loading-platform, no matter at what angle the loading-platform may be placed.

A further object is to provide an improved and simplified means for bracing the hinged side pieces of the rack and firmly support them, whether in their elevated or lowered positions.

My invention consists in certain details in the construction, arrangement, and combination in the various parts of the device, whereby the objects contemplated are attained, as hereinafter more fully set forth, pointed out in my claims, and illustrated in the accompanying drawings, in which—

Figure 1 shows in perspective the complete wagon-box with one of the side pieces in an upright position, as required for use as a stock-rack, and the other side piece in a horizontal position, as required for use as a hay-rack, and also showing the end-gate in position for use as a loading-platform. Fig. 2 shows in perspective the rear end portion of the rack with the end-gate in position for use as a loading-platform and with the side pieces in position thereon. Fig. 3 shows the rear end elevation of the end-gate. Fig. 4 shows an edge view of the modified form of the end-gate and loading-platform. Fig. 5 shows a detailed sectional view of the front end portion of the rack to illustrate the construction of the front piece of the wagon-rack and also showing by dotted lines the position of the front as it would appear when lowered. Fig. 6 shows an enlarged detailed vertical sectional view through the indicated lines 6 6 of Fig. 7. Fig. 7 shows the outside face view of one of the pieces for supporting the hinged sides of the rack. Fig. 8 shows a vertical central sectional view of the end-gate. Fig. 9 shows in perspective the brace for holding the sides of the rack together. Fig. 10 shows a face view of one of the brackets for forming a part of the braces for the sides of the rack. Fig. 11 shows a sectional perspective view on the indicated line 11 11 of Fig. 10.

Referring to the accompanying drawings, I have used the reference-numeral 10 to indicate the bottom of the wagon-bed. 11 indicates the side pieces of the wagon-bed firmly fixed to the bottom in the ordinary way. At the front of the wagon-bed is a cross-strip 12, fixed at its ends to the side pieces 11 at the top forward edges thereof.

The front of the rack comprises two uprights 13, hinged at the forward corner of the wagon-bed upon the rod 14. These uprights have secured to their front edges the solid front 15 to form the front of the wagon-bed and the strips 16 to form the front of the rack, and when in their elevated position the uprights 13 rest against the strips 12, thus limiting the forward movement of the front, and obviously the entire front may be folded rearwardly and downwardly, as indicated in the dotted lines in Fig. 5, to rest upon the bottom of the wagon-bed.

The reference-numeral 17 is used to indicate the hinged side pieces of the rack. These side pieces are connected by means of the braces 18, of which there are preferably four for each side piece. Each of these braces has on its outer face a recess 19 extending throughout the major portion of the length of the brace, and the numeral 20 indicates a metal strap of a length nearly as great as that of the brace, and said strap is attached to the outer face of the brace at both ends of the recess 19, so that the recess forms a slot, and the lower end of the strap 20 is curved to form a hinge member 21.

Beneath each of the braces 18 is a cast-metal bracket 22, having at its top the hinge member 23, designed to admit the hinge member 21 between them and to thereby produce a hinge-joint. At the bottom of the bracket 22 is an outwardly-projecting lug 24, having an opening therein to receive a bolt 25, for purposes hereinafter made clear.

The reference-numeral 28 is used to indicate a pair of arms or braces, preferably curved at their lower ends and connected at their upper ends by means of a bolt 27, which bolt passes through the recess 19 and is provided with the roller 26, of a size to fill the slot formed by the said recess and strap 20. These arms or braces 28 are also attached at their lower end to the bolt 25. As will be seen by the accompanying drawings, there are four of the cast-metal brackets 22 secured to each of the sides of the wagon-box, and for each bracket there is a brace 18 and a pair of arms 28, except that at the forward end of the wagon the arms 28 are omitted, as they would probably interfere with the front wheel of the wagon. In use with this portion of the wagon it is obvious that when the sides of the rack are in their lowered position the arms 28 will firmly support said side pieces in position, because the rollers 26 have their movement limited by the length of the recess 19, and when the side pieces of the rack are moved to their upward position they are held from swinging inwardly by the rollers 26 in the recess 19 and also because the sides engage the front and back end pieces of the wagon. In this connection I have provided means for preventing the side pieces of the rack from spreading or swinging outwardly, as follows: The numeral 29 indicates a bar having its ends turned upwardly at 30 and far enough apart so that when the bar is placed on top of the side pieces of the rack the ends 30 will overlap the rack, and this bar is held in position by means of the pins 31, which pass through the ends of the bar and through openings in the top of the side pieces of the rack, and these pins are connected with the bar 29 by means of the chains 32.

I have provided an improved combined end-gate and loading-platform which comprises two side pieces 33, having on their inner faces two angle-irons 34, so arranged as to form a longitudinal groove between them. At the outer end of the parts 33 is a rigid cross-piece 35, and the inner ends of the parts 33 are pivotally connected with the wagon-box by means of the rod 36. I have placed in the groove formed by the angle-irons 34 a frame 37, the vertical dimensions of which are substantially half those of the end-gate, and this frame may move vertically in the groove formed by the angle-irons. I have also provided a spring-catch 38 to pass through the angle-iron at one side of one of the uprights 33 to lock the frame 37 at its downward limit of movement and to prevent rattling and also to secure the frame 37 at its upward limit of movement. The upper half of the end-gate is closed by means of the cross-pieces 39, which are rigidly secured at their ends to the side pieces 33. At the outer corners of the parts 33 are the perforated lugs 40, the function of which will hereinafter be shown.

In the modified form shown in Fig. 4 I have provided means by which the end-gate may be doubled in length when in use as a loading-platform, as follows: The numeral 41 indicates the hinged extension attached to the outer end of the uprights 33 and capable in one position of folding parallel with the uprights 33 and in another position to assume a position in alinement with the uprights 33, the hinges being so arranged as to prevent the hinged section of the end-gate from moving beyond a position in alinement with the upright 33, so as to form a rigid platform upon which the stock may enter the wagon. I have also provided side pieces for the loading-platform, as follows: The numeral 42 indicates two parallel uprights, one of which has at its outer end a downwardly-projecting pin 43, and the numeral 44 indicates two similar uprights. Between these uprights is a series of strips 45, which are pivotally connected at their ends with the uprights 42 and 44 by means of the bolts 46, and at one end of the frame thus formed are the two metal loops 47, which are designed for attachment to the hooks 48 on the rear end of the braces 18. In use with this portion of the device the end-gate is first placed in a position for use as a loading-platform. Then the frames are connected therewith by having the pins 43 placed in the perforated lugs 44, and the loops 47 are hung on the hooks 48. Because the strips are pivotally connected at their ends with the uprights it is obvious that the frame will securely fit on the loading-platform, no matter at what angle the loading-platform may stand, and these frames or side pieces for the loading-platform are easily and quickly attached and yet when in position are firmly braced.

Having thus described my invention, what I claim, and desire to secure by Letters Patent of the United States, is—

1. In a device of the class described, the combination with a wagon-box and hinged extension side pieces thereon, of an end-gate hinged at one end to the wagon-box and capable of swinging rearwardly and downwardly to form a stock-holding platform, said end-gate having side pieces provided with longitudinal grooves on their inner faces, a frame slidingly mounted in said grooves and crosspieces rigidly secured to the side pieces to cover the outer end portion of the end-gate for the purposes stated.

2. In a device of the class described, the combination with a wagon-box and hinged extension side pieces thereon, of an end-gate comprising two parallel side pieces hinged at one end to the wagon-box, two angle-irons on the inner face of each of said side pieces to form a longitudinal groove between them, said angle-irons having transverse openings through them, pins to pass through said openings, a frame slidingly mounted in said grooves to be engaged and supported by said pins and rigid cross-pieces secured to the side pieces to cover the outer end portion of the end-gate for the purposes stated.

3. In a device of the class described, the combination with a wagon-box and hinged extension side pieces thereon, of an end-gate comprising two parallel side pieces hinged at one end to the wagon-box, two angle-irons on the inner face of each of said side pieces to form a longitudinal groove between them, said angle-irons having transverse openings through them, pins to pass through said openings, a frame slidingly mounted in said grooves to be engaged and supported by said pins and rigid cross-pieces secured to the side pieces to cover the outer end and portion of the side pieces, perforated lugs at the outer end of the end-gate, hooks secured to the extension sides to project rearwardly and upwardly, and side pieces for the stock-loading platform and end-gate, which side pieces comprise two uprights, one upright having a downwardly-projecting pin to enter one of the perforated lugs, a series of strips pivoted to the uprights and loops on the strips to engage the said hooks for the purposes stated.

4. In a device of the class described, the combination with a wagon-box of extension side pieces therefor, and a number of devices for hinging each side piece to the wagon-box, each of said devices comprising a bracket to be secured to the wagon-box and having at its top a hinge member, a brace to be secured to the extension side pieces above the bracket and having a recess in its outer face, a strap secured to the outer face of the brace to overlap the recess and to form a slot, the lower end of said strap being shaped to form a hinge member coacting with the other hinge member, a bolt to connect the hinge members and a pair of arms pivotally connected with the lower portion of the bracket and a bolt fixed to the frames and ends of the arms and passed through the recess in the braces and a roller on said bolt, said parts being so arranged and proportioned relative to each other that when the extension side pieces assume a substantially horizontal position the said roller will have reached the outer end of the recess, substantially as and for the purposes stated.

CLARENCE H. WILLIAMS.

Witnesses:
J. RALPH ORWIG,
W. R. LANE.